United States Patent Office 3,522,201
Patented July 28, 1970

3,522,201
PHASE SEPARATION COATING COMPOSITIONS AND SUBSTRATES COATED THEREWITH
Alan K. MacNair, Keyser, W. Va., assignor to Westvaco Corporation, New York, N.Y., a corporation of Delaware
No Drawing. Original application Sept. 3, 1964, Ser. No. 394,348, now Patent No. 3,377,191, dated Apr. 9, 1968. Divided and this application Sept. 27, 1967, Ser. No. 680,283
Int. Cl. B44d 5/00; C08f 45/34; C08g 37/34
U.S. Cl. 260—32.8                                    8 Claims

ABSTRACT OF THE DISCLOSURE

Coating compositions which can be rendered opaque in the absence of pigmentation by phase separating wet films of the compositions in the presence of water or steam, wherein the coating compositions comprise alcoholic or acetone solutions containing a water-insoluble partial ester of a carboxyl-containing styrene copolymer and a water-soluble amino resin, and optionally containing polyvinyl acetate and glyoxal.

---

This application is a division of the copending application Ser. No. 394,348, filed on Sept. 13, 1964, now U.S. Pat. 3,377,191.

This invention relates to novel coating compositions and to substrates coated with them. More particularly, this invention relates to novel, opaque and bright coatings prepared by a phase separation technique and to paper or paperboard coated therewith, whereby paper products which possess combined high glosses and high brightnesses heretofore unknown in the art of paper coating are obtained.

The term "phase separation" covers that phenomenon which occurs when a wet film, consisting of a resin dissolved in a solvent, is immobilized by dilution of the resin-solvent with a diluent which is miscible with the resin-solvent but in which the resin is insoluble. Upon dilution of the solvent by the diluent, molecules of the resin are phase separated and immobilized, forming a rigid, high gloss, high bulk, microporous structure with a great amount of air-resin interfaces. As the diluent progresses into the solvent, diluting the solvent throughout the wet film, immobilization of the entire wet film occurs as resin molecules throughout the entire wet film are phase separated out of solution. The final film thickness of the phase separated coatings of this invention is essentially the same as the thickness of the original wet film which has been "frozen" by phase separation. High brightness and opacity result from the creation of micropores between resin molecules fixed in place by the phase separation phenomenon, and high gloss results from the immobilization of the wet film without substantial shrinkage thereof.

The coatings of this invention may be applied to a traveling web of paper, paperboard or other films or substrates by any conventional coating apparatus such as a knife coater, a roll coater, or a rotating rod coater. After the coating is applied to the web, the wet coating is immobilized by immersing the web in a diluent or by subjecting the web to a spray of the diluent. Such an immobilization of a coating of this invention can be accomplished by exposing the wet coating of resin and solvent to a water mist spray, a steam spray or steam shower, or a water immersion treatment. The immobilization treatment should be carried out as soon as convenient after application of the wet coating to the web. When the wet coating is immobilized with steam, ventilation is desirable as the solvent removal apparently produces cooling which aids the solvent dilution by increasing moisture condensation.

After exposure to the immobilization treatment, a short time lapse is necessary for the development of the high bulk, microporous, resinous structure. The diluent is then removed from the web by conventional paper dryers such as dryer drums or radiant dryers.

The novel coatings of this invention include as a primary ingredient a partial ester of a carboxyl-containing styrene copolymer. Such copolymers may be further defined as equimolar copolymers of styrene and a half alkyl ester of maleic acid. The half alkyl esters of maleic acid that can be used include those half esters in which the alkyl group contains from one to eight carbon atoms such as the half methyl maleate, the half ethyl maleate, etc. The preferred coatings include as the resin an equimolar copolymer of styrene and the half sec-butyl ester of maleic acid (having a number average molecular weight of at least about 3,000) or an equimolar copolymer of styrene and the half ethyl ester of maleic acid (having a number average molecular weight of at least about 3,000).

The preferred solvent employed for the above noted copolymers is ethyl alcohol. Other solvents, such as acetone and methyl alcohol, may be substituted for ethanol on a one to one weight basis. The copolymer is dissolved in the solvent and a wet film of coating is applied to a traveling web. The coating is then immobilized by a steam or water spray or preferably by water immersion, thereby diluting the solvent and phase separating the copolymer to form an opaque, microporous coating of surprising and extraordinary brightness and gloss. Brightnesses of the coated substrates of at least about 86, as measured on the G.E. scale, and glosses over 90, are obtainable.

The following examples are set forth to more clearly illustrate the principles, coatings, processes and products of this invention. Where parts are mentioned below, they are parts by weight unless otherwise indicated.

EXAMPLE 1

A solution of resin was prepared by warming 160 parts of ethanol to about 150° F. and adding, with rapid stirring, about 60 parts of an equimolar copolymer of styrene and the half sec-butyl ester of maleic acid having a number average molecular weight of about 3,000. Agitation at 150° F. was continued until solution was effected. Fifteen (15) parts of urea formaldehyde resin were then added with stirring and the heat source was removed.

The above coating was coated onto 14 point (caliper of .014 inch) paperboard at a coat weight of about 7 pounds (ream of 500 sheets, 25 x 38 inches) and the coated paperboard was immersed in water at room temperature for about 30 seconds. The coated paperboard was removed from the immersion treatment and dried at 105° C.

The wet coating was clear when applied to the paperboard. Upon immersion in water, the copolymer was phase separated and a white coating began to develop, and a very bright, white, and glossy coating developed on the paperboard upon removal of the water-solvent mixture from the coating layer. The final dried product comprised a paperboard substrate coated with an adherent and very bright, white, glossy, high bulk, microporous coating. The G.E. brightness of the board before coating was about 78, and the gloss was about 35. Part of the above coated paperboard was not subjected to a water immersion treatment but was dried in similar fashion to that part of the paperboard which was immersed in water, and the brightness of this coated paperboard was only 74 and the gloss was about 92. However, the coated paperboard which was immersed in water as described above exhibited a brightness of 87 and a gloss of 95. It is thus seen that the paperboard coated with the phase separated coating had a materially higher brightness than the coated paperboard which was not subjected to the phase separation coating technique, and the gloss was not adversely affected by the phase separation technique, but was in fact improved.

Throughout the specification and claims, the gloss measurements are in accordance with Tappi Standard T-480m-51 with the glossmeter standardized with a black carrara glass as 100.

EXAMPLE 2

While the phase separated coating prepared in Example 1 is very white, bright and glossy and suitable for many applications, it may be too brittle for some purposes. The impact resistance of the coating can be improved by the addition of alkli soluble polyvinyl acetate. To the formulation in Example 1, fifteen (15) parts of polyvinyl acetate were added. The polyvinyl acetate was added with the resin copolymer of Example 1 with rapid stirring in the warmed ethanol until solution was effected. The coating was coated onto paperboard similar to that in Example 1, and a phase separated coating was developed by water immersion. After drying, the coated paperboard had a G.E. brightness of about 90 and a gloss of about 92. The coating was much less brittle than that of Example 1 and was not subject to being easily collapsed by impact.

EXAMPLE 3

Where the coated products of Examples 1 and 2 are to be printed, it may be desirable to add a component to the coating formulation to increase the pick strength of the phase separated coating. Glyoxal, in an amount of about 2 parts, was added to the formulation of Example 2. The wax pick was improved by the glyoxal addition from a No. 2 I.G.T. ink to a No. 3 I.G.T. ink. The final dried product exhibited an excellent G.E. brightness of about 93 and a gloss of about 95 Brightness values obtained with this coating on 14 point paperboard have ranged from 92 to 97, with an average G.E. brightness of 93. Gloss values have ranged from 90 to 100, with an average value of 96. Combinations of brightness and gloss in these ranges have heretofore been unknown in the art of paper coating.

This formulation, i.e., about 60 parts of an equimolar copolymer of styrene and the half sec-butyl ester of maleic acid, about 15 parts urea formaldehyde resin, about 15 parts polyvinyl acetate, about 2 parts glyoxal, and about 160 parts ethanol, represents the preferred formulation for a phase separated coating for paper or paperboard to produce a product of the highest quality for printing purposes. The formulation may be varied as follows with no significant changes in the quality of the final coated substrate: about 30 to 60 parts of the styrene and half sec-butyl ester of maleic acid, about 12 to 20 parts urea formaldehyde resin, about 15 to 30 parts polyvinyl acetate, about 2 to 12 parts glyoxal, and about 120 to 185 parts ethanol. If less than about 15 parts polyvinyl acetate is used, the coatings become relatively brittle. If less glyoxal than about 2 parts is used, the coatings have a relatively low pick strength. However, it should be kept in mind that the formulation of Example 1, which does not contain polyvinyl acetate or glyoxal, produces a bright, white, and glossy phase separated coating which is useful for many purposes.

Melamine formaldehyde resin may be substituted for urea formaldehyde resin in any of the examples of this specification on a one to one weight basis, and comparable resutls will be obtained.

EXAMPLE 4

The above examples have included the half butyl maleate-styrene copolymer as the primary component of the phase separated coatings. Other half alkyl ester may be used, specifically those half esters in which the alkyl group contains 1 to 8 carbon atoms. For example, a solution of resin was prepared by dissolving about 60 parts of an equimolar copolymer of styrene and the half ethyl ester of maleic acid (having a number average molecular weight of about 3500) in about 185 parts of ethanol warmed to about 150° F., and about 30 parts polyvinyl acetate were stirred in. Approximately 12 parts urea formaldehyde resin were carefully added and the heat source was removed. Then about 12 parts glyoxal were stirred in by small increments.

The above coating was coated onto 14 point paperboard at a coat weight of about 7 pounds, and the coated paperboard was immersed in water at room temperature for about 30 seconds. The coated paperboard was removed from the immersion treatment and dried at 105° C. The dried product comprised a paperboard substrate coated with an adherent, white, bulky, microporous coating which exhibited a G.E. brightness of about 90 and a gloss of about 94. The brightness of the paperboard before coating was about 78, and the gloss was about 35. Some of the paperboard which was not subjected to the water immersion treatment was dried in similar fashion to that which was immersed in water, and the brightness of the coated paperboard was only 74 and the gloss was about 92. It is thus seen that the paperboard coated with the phase separated coating had a materially higher brightness than the coated paperboard which was not subjected to the phase separation coating technique, and the gloss was not adversely affected by the phase separation technique.

As with the half sec-butyl maleate copolymer, certain of the above components may be left out of the formulation which contains the half ethyl maleate copolymer, and a bright and glossy phase separated coating can be produced. When the polyvinyl acetate and glyoxal were deleted from the above formulation, a bulky, white, microporous coating was produced which exhibited a G. E. brightness of about 86 and a gloss of about 95. The polyvinyl acetate and glyoxal may be employed where higher degrees of impact resistance and pick strenght are desired. Melamine formaldehyde resin may be used to replace urea formaldehyde resin on a one to one weight basis.

The formulation of Example 4 may be varied within the same limits as set out in Example 3.

EXAMPLE 5

As previously stated, various types of substrates other than paper or paperboard, such as glassine, glass, cellophane, and wood, may be coated with the phase separation coating of this invention. For example, the coating of Example 3 was coated onto 1.5 mils cellophane at a coat weight of about 7 pounds, and the coated substrate was immersed in water for about 30 seconds and then dried at 105° C. A final product comprising a cellophane substrate coated with an adherent, white, bulky, microporous, phase separated coating was produced, the G.E. brightness of which was about 93, and the gloss was about 75. It is thus apparent that the coatings of this invention find great utility not only on paper and paperboard substrates to produce paper products with combined glosses and brightnesses heretofore unknown, but they find utility on other flexible and nonflexible substrates to which coatings of high brightness and gloss are normally applied or desired.

From the above examples and ranges of components of the phase separated coatings of this invention, it is seen that the coating formulations will comprises alcoholic or acetone solutions containing from about 18 to about 51 weight percent dissolve solutes. The solutes in the coatings will comprise from about 50 to 100 weight percent of a partial ester of a carboxyl-containing styrene copolymer and a water soluble amino resin in the weight ratios of from about 1.5 to 1 to about 5 to 1 and preferably from about 4 to 1 to 5 to 1, and may comprise up to about 50 weight percent of polyvinyl acetate and glyoxal in the weight ratios of from about 1.25 to 1 to about 15 to 1 and preferably from about 2 to 1 to 7 to 1.

The phase separation coatings of this invention yield final dried coatings which are bulky as compared to the same coatings which are not subjected to water treatment. Photomicrographs of paperboard coated with the phase separated coating of Example 3 show that the film thickness of the coating when dried is about three times as great as the same coating which is not subjected to the phase separation treatment before drying, and it has been determined that the phase separation coatings of this invention have film thicknesses when dried which are from about two to five times as great as the same coatings which are not subjected to the phase separation treatment, the ratio running inversely as the solutes in the coatings vary from 18 to 51%.

The phase separated coatings of this invention also possess an internal microporous structure. That a porous internal structure is present is evidenced by the fact that the surface of a phase separated coating readily absorbs liquids, such as water, whereas the air dried coatings, which are not phase separated, do not. Surface photographs of the phase separated coatings of this invention, as taken from an electron microscope at 66,800 magnification, do not show a porous surface.

When water immersion, as opposed to a steam or water mist spray, is used to immobilize the wet coatings of this invention, it has been found that at least a 4 second immersion treatment is necessary to develop the phase separated coatings, with a preferred range of from 30 to 60 seconds. The time lapse, however, between application of the wet coating to the substrate and treatment with the diluent does not appear to be critical short of allowing the coating to be air dried before treatment with the diluent, but it is preferred to subject the wet coating to the diluent treatment within about five seconds after application of the wet coating. By wet coating, it is meant the alcoholic solution of the partial ester of the carboxyl-containing styrene copolymer and polyvinyl acetate and other components, when used, which make up the dissolved solids.

When steam treatments are used, such as passing the web through a steam shower, instead of water immersion to immobilize the wet coating, it is preferred that an exposure to the steam of from 15 to 30 seconds be employed.

The coatings described above are unpigmented coatings which derive their opaque nature from the phase separation technique. However, the wet coatings before immobilization may include pigments and dyes in addition to the components set forth in the above examples.

The coatings of this invention may be dried at any temperature up to about 105° C. Higher temperatures may be employed but the bulk of the coatings may be lessened as a result.

The above examples and descriptions are for purposes of illustration only and various modifications may be made therein without departing from the spirit of this invention or the scope of the appended claims.

I claim:

1. A coating composition which can be rendered opaque in the absence of pigmentation by phase separating a wet film of the composition in the presence of water or steam, which comprises a solution of ingredients comprising by weight about 50 to 100% of a water-insoluble equimolar copolymer of styrene and a half alkyl ester of maleic acid, and a water-soluble amino resin selected from the group consisting of urea-formaldehyde and melamine-formaldehyde resins, said copolymer and amino resin being present in the weight ratio of about 1.5 to 1 to about 5 to 1, respectively, said ingredients further comprising conversely from about 50% to 0%, by weight, of polyvinyl acetate and glyoxal in the weight ratio of about 1.25 to 1 to about 15 to 1, respectively, said ingredients being dissolved in a solvent selected from the group consisting of methanol, ethanol, and acetone to form a solution containing about 18 to 51% by weight of the ingredients.

2. A coating composition according to claim 1 in which the weight ratio of copolymer to amino resin is about 4 to 1 to about 5 to 1, the weight ratio of polyvinyl acetate to glyoxal is about 2 to 1 to about 7 to 1, and the alkyl group of the half alkyl ester of maleic acid contains from 1 to 8 carbon atoms.

3. A phase separation coating composition comprising, by weight, about 120 to 185 parts ethanol and dissolved therein about 30 to 60 parts of a water-insoluble equimolar copolymer of styrene and a half alkyl ester of maleic acid, about 12 to 20 parts of a water-soluble amino resin selected from the group consisting of urea-formaldehyde and melamine-formaldehyde resins, about 15 to 30 parts polyvinyl acetate, and about 2 to 12 parts glyoxal, the weight percent of the solutes dissolved in the ethanol varying from about 24% to about 51%.

4. A phase separation coating composition according to claim 3 in which the alkyl group of the half alkyl ester of maleic acid contains from 1 to 8 carbon atoms.

5. A phase separation coating composition according to claim 4 in which the half alkyl ester of maleic acid is the half sec-butyl ester of maleic acid.

6. A phase separation coating composition according to claim 4 in which the half alkyl ester of maleic acid is the half ethyl ester of maleic acid.

7. A phase separation coating composition comprising, by weight, about 120 to 185 parts ethanol and dissolved therein about 30 to 60 parts of a water-insoluble equimolar copolymer of styrene and a half alkyl ester of maleic acid, and about 12 to 20 parts of a water-soluble amino resin selected from the group consisting of urea-formaldehyde and melamine-formaldehyde resins, the weight percent of the solutes dissolved in the ethanol varying from about 18% to about 40%.

8. A phase separation coating composition according to claim 7 in which the alkyl group of the half alkyl ester of maleic acid contains from 1 to 8 carbon atoms.

References Cited

UNITED STATES PATENTS

| 2,454,284 | 11/1948 | Kirk | 260—32.8 |
| 2,760,945 | 8/1956 | Bodenschatz et al. | |
| 3,097,183 | 7/1963 | Drubel et al. | |
| 3,256,221 | 6/1966 | Cooper | 260—32.8 |
| 3,388,106 | 6/1968 | Muskat | 260—33.4 |

OTHER REFERENCES

Modern Plastics Encyclopaedia, 1963 (September 1962), (McGraw-Hill N.Y.), pp. 150–152.

MORRIS LIEBMAN, Primary Examiner

H. H. FLETCHER, Assistant Examiner

U.S. Cl. X.R.

117—63; 260—2.5, 33.4, 855